(12) United States Patent
Zumsteg (10) Patent No.: US 8,547,960 B2
(45) Date of Patent: Oct. 1, 2013

(54) SUB-FRAME SYNCHRONIZED SIGNALING

(75) Inventor: Philip J. Zumsteg, Shorewood, MN (US)

(73) Assignee: Honeywell International Inc., Morristown, NJ (US)

( * ) Notice: Subject to any disclaimer, the term of this patent is extended or adjusted under 35 U.S.C. 154(b) by 1821 days.

(21) Appl. No.: 11/181,281

(22) Filed: Jul. 14, 2005

(65) Prior Publication Data

US 2007/0014315 A1    Jan. 18, 2007

(51) Int. Cl.
*H04J 3/06*    (2006.01)

(52) U.S. Cl.
USPC .......................................................... 370/350

(58) Field of Classification Search
USPC .......................................................... 370/350
See application file for complete search history.

(56) References Cited

U.S. PATENT DOCUMENTS

| | | | | |
|---|---|---|---|---|
| 3,813,496 | A * | 5/1974 | Maillet | 370/324 |
| 4,021,780 | A | 5/1977 | Narey et al. | |
| 6,275,471 | B1 | 8/2001 | Bushmitch et al. | |
| 6,292,516 | B1 * | 9/2001 | Petsko et al. | 375/267 |
| 7,376,045 | B2 | 5/2008 | Falkenberg et al. | |
| 2005/0024038 | A1 | 2/2005 | Santhoff et al. | |
| 2005/0030931 | A1 | 2/2005 | Sung et al. | |
| 2005/0063328 | A1 * | 3/2005 | Dunagan et al. | 370/324 |
| 2005/0096031 | A1 | 5/2005 | Sugaya et al. | |
| 2005/0135284 | A1 * | 6/2005 | Nanda et al. | 370/294 |
| 2006/0187909 | A1 * | 8/2006 | Sho et al. | 370/389 |
| 2006/0291537 | A1 * | 12/2006 | Fullerton et al. | 375/145 |
| 2007/0232339 | A1 | 10/2007 | Ji et al. | |
| 2007/0253400 | A1 | 11/2007 | Zumsteg | |
| 2008/0056308 | A1 | 3/2008 | Zumsteg | |
| 2008/0170559 | A1 | 7/2008 | Zumsteg | |

OTHER PUBLICATIONS

Barrett, Terence, History of Wideband (UWB) Radar & Communications: Pioneers and Innovators, 4 pgs., published prior to 2005.
Fontana, Robert J., A Brief History of UWB Communications,,Publisher: Multispectral Solutions, Inc., 4 pgs., published prior to 2005.
Girod, Lewis, Localization, , Publisher: Distributed Embedded Systems, 61 pgs., published prior to 2005.
802.15.3 MAC layer Overview and Proposed Enhancements to Support UWB PHY, Publisher: Mobile and Portable Radio Research Group, Virgina Tech, 37 pgs., published prior to 2005.
Lee, K.K., UWB Overview , 80 pgs., published prior to 2005. p. 80.
Pomalaza-Raez, Carlos et al., A Unified Approach to Dynamic TDMA Slot Assignment and to Distributed Routing for Multi-Hop Packet Radio Networks, 6 pgs., published prior to 2005.

(Continued)

*Primary Examiner* — Steven Lim
(74) *Attorney, Agent, or Firm* — Fogg & Powers LLC (57) ABSTRACT

A communication system is provided. In one embodiment, a communication system includes communicant nodes. Each node includes a local clock, a transmitter/receiver circuit and a control circuit. The local clock is adapted to clock operations of the communication node. The transmitter/receiver circuit is adapted to selectively transmit and receive communication signals. The synchronization circuit is adapted to synchronize the local clock with a received communication signal from another communication node to establish communications between the communication nodes. The control circuit is adapted to control the transmitter/receiver circuit and the synchronization circuit. The control circuit is also adapted to process communication signals and to direct communications between the communication nodes without re-synchronizing the local clock until the clock drift between communication nodes makes communications unreliable.

29 Claims, 8 Drawing Sheets

(56) References Cited

OTHER PUBLICATIONS

Somayazulu, V. Srinivasa et al., Design Challenges for Very High Data Rate UWB Systems, , Publisher: Intel Labs, Published in: Hillsboro, OR, 5 pgs., published prior to 2005.
Webb, Warren, Ultrawideband: An Electronic Free Lunch?, Dec. 21, 2000, pp. 85-92, Publisher: EDN, Published in: US.
Young, C. David, USAP Multiple: Dynamic Resource Allocation for Mobile Multihop Multichannel Wireless Networking, pp. 1-5, Publisher: IEEE, 1999.
United Kingdom Patent Office, "Office Action", "From Foreign Counterpart of U.S. Appl. No. 11/320,089", Jan. 26, 2010, Published in: GB.
United Kingdom Patent Office, "Office Action", "From Foreign Counterpart of U.S. Appl. No. 11/320,089", Jun. 9, 2010, Published in: GB.
Korean Intellectual Property Office, "Decision to Grant a Patent", "From Foreign Counterpart of U.S. Appl. No. 11/320,089", Dec. 27, 2012, pp. 1-3, Published in: KR.
Korean Patent Office, "Office Action", "From Foreign Counterpart of U.S. Appl. No. 11/320,089", Sep. 17, 2012, pp. 1-5, Published in: KR.
U.S. Patent and Trademark Office, "Notice of Allowance", "U.S. Appl. No. 11/320,089", Apr. 6, 2009, pp. 1-6.
U.S. Patent and Trademark Office, "Notice of Allowance", "U.S. Appl. No. 11/320,089", Jun. 26, 2009, pp. 1-7.
U.S. Patent and Trademark Office, "Office Action", "U.S. Appl. No. 11/320,089", Dec. 23, 2008, pp. 1-15.
European Patent Office, "Office Action", "From Foreign Counterpart of U.S. Appl. No. 11/380,252", Apr. 14, 2009, pp. 1-2, Published in: EP.
U.S. Patent and Trademark Office, "Final Office Action", "U.S. Appl. No. 11/380,252", Oct. 19, 2009, pp. 1-23.
U.S. Patent and Trademark Office, "Notice of Allowance", "U.S. Appl. No. 11/380,252", Mar. 11, 2010, pp. 1-10.
U.S. Patent and Trademark Office, "Office Action", "U.S. Appl. No. 11/380,252", May 12, 2009, pp. 1-33.
International Preliminary Examining Authority, "International Preliminary Report on Patentability", "From Foreign Counterpart of U.S. Appl. No. 11/380,252", Nov. 6, 2008, pp. 1-4, Published in: WO.
International Searching Authority, "International Search Report", "From Foreign Counterpart of U.S. Appl. No. 11/380,252", Dec. 18, 2007, pp. 1-9, Published in: WO.
U.S. Patent and Trademark Office, "Advisory Action", "U.S. Appl. No. 11/468,462", Nov. 2, 2009, pp. 1-6.
U.S. Patent and Trademark Office, "Notice of Allowance", "U.S. Appl. No. 11/468,462", Feb. 1, 2010, pp. 1-12.
U.S. Patent and Trademark Office, "Office Action", "U.S. Appl. No. 11/468,462", Apr. 3, 2009, pp. 1-31.
U.S. Patent and Trademark Office, "Office Action", "U.S. Appl. No. 11/468,462", Sep. 4, 2009, pp. 1-23.
U.S. Patent and Trademark Office, "Notice of Allowance", "U.S. Appl. No. 11/624,045", Nov. 24, 2008, pp. 1-12.
U.S. Patent and Trademark Office, "Office Action", "U.S. Appl. No. 11/624,045", May 5, 2008, pp. 1-13.
Guvenc, L.; Sahinoglu, Z.; Molisch, A.F.; Orlik, R, "Non-Coherent TOA Estimation in IR-UWB Systems With Different Signal Waveforms", "Broadnets 2005, 2nd International Conference", Oct. 2005, pp. 1168-1174, vol. 2, Publisher: Broadband Networks, 2005.
Wikipedia, "MAC Address", Apr. 1, 2005, pp. 1-5, Publisher: Wikipedia.
Wotel, Paul, "The Difference Between Half and Full Duplex Explained", Apr. 11, 2005, p. 1 Publisher: HelloDirect.

\* cited by examiner

SUB-FRAME SYNCHRONIZED SIGNALING

TECHNICAL FIELD

The present invention relates generally to the field of wireless communications, and in particular, to systems and methods of collaboration among multiple nodes in time-synchronized communication systems.

BACKGROUND

A typical wireless communication system is composed of two or more transmitter/receiver nodes adapted to communicate with each other. Communication systems, such as cell phone systems, use frequency, time and code division multiplexing to ensure only a single transmitter is active at any given instant in time (i.e. for a given set of frequencies and codes). To accomplish a message exchange between nodes, each node is adapted to selectively switch between transmit and receive modes by local node control.

Wireless data communications systems, such as conventional radio frequency systems, provide data communications by modulating, or coding, data signals onto a carrier frequency(s). However, other types of wireless communication systems are carrier-less and rely on time-based coding for data communications. One such communication system that relies on time-based coding to achieve reliable data communications is Ultra Wide Band ("UWB").

These UWB systems, unlike conventional radio frequency communications technology, do not use band-limited carrier frequencies to transport data. Instead UWB systems make use of a wide band energy pulse that transports data using both time-based coding and signal polarization. Time-based coding methods include pulse-position, pulse-rate or pulse-width techniques. By definition, a UWB system does not provide a common clock to the transmitting and receiving nodes. Instead, a low-drift clock is implemented in each transmitter/receiver node, providing a local reference for time-based coding and decoding. Each of these multiple clock domains is subject to short-term time drift, which will exceed the necessary tolerance for accurate UWB system operation after a predictable time period. As a result, precise time synchronization between the transmitting node and receiving node(s) is imperative in UWB systems to obtain accurate data communications. In order to precisely synchronize the receiving node(s) with the transmitting node, UWB systems typically require long preambles for each transmitted data frame. However, some applications with potential to benefit from UWB technology cannot tolerate the elapsed time resulting from preambles at the beginning of each frame or cannot be implemented if a preamble is required. Also, many potential applications for UWB technology are size and energy constrained, such as networks of unattended wireless sensors and controls, which seek to minimize transmission time and to conserve energy.

Existing applications employing UWB technology include short-range radar systems and high speed wireless communications characterized by large amounts of data requiring isochronous signaling, such as real-time voice and video. Generally, the signal used for a UWB application requires a preamble at the beginning of each transmitted frame to enable a receiver(s) to synchronize with the time-based coding being transmitted. The time required for transmitting the preamble, and subsequent data, imposes a minimum time between reversals in the direction of data communications between two transmitter/receiver nodes in a UWB system, which in turn restricts the scope of applications suitable for UWB implementation. Also, the energy consumed to transmit the preamble for existing applications is a significant fraction of the overall energy required to transmit the preamble and subsequent data.

For the reasons stated above, and for other reasons stated below which will become apparent to those skilled in the art upon reading and understanding the present specification, there is a need in the communication industries for a method to provide collaboration among two or more transmitter/receiver nodes that eliminates multiple re-synchronization preambles and minimizes energy consumption at each node.

SUMMARY

The above-mentioned problems of current communication systems are addressed by embodiments of the present invention and will be understood by reading and studying the following summary and specification.

In one embodiment a method of communication is provided. The method comprises transmitting a communication signal having a synchronization preamble from a first node. Setting a local clock of at least one second node pursuant to the synchronization preamble to synchronize communications between the first and at least one second node and exchanging subsequent communication signals between the first and at least one second node without additional preambles until synchronization suitable for data communication is lost.

In another embodiment, a method of communicating in an ultra wideband communication (UWB) system is provided. The method comprises transmitting an initial communication signal frame having a preamble that contains clock synchronization information from a first node. Receiving the initial communication signal frame with at least one second node. Synchronizing a local clock in the at least one second node pursuant to the clock synchronization information in the initial transmission signal frame. Exchanging sub-frame communication signals between the first node and at least one second node. Monitoring clock synchronization drift between the local clock in at least one second node and a local clock in the first node and when the clock synchronization drift has drifted far enough apart that synchronization suitable for UWB data communication has been lost, transmitting another initial communication signal frame having the preamble that contains the clock synchronization information to re-synchronize communication between the nodes.

In still another embodiment, a communication node is provided. The communication node includes a local clock, a transmitter/receiver circuit and a control circuit. The local clock is adapted to clock operations of the communication node. The transmitter/receiver circuit is adapted to selectively transmit and receive communication signals. The synchronization circuit is adapted to synchronize the local clock with a received communication signal from another communication node to establish communications between the communication nodes. The control circuit is adapted to control the transmitter/receiver circuit and the synchronization circuit. The control circuit is also adapted to process communication signals and to direct communications between the communication nodes without re-synchronizing the local clock until the clock drift between communication nodes makes communications unreliable.

In yet another embodiment, another communication node is provided. The communication node includes a local clock, a transmitter, a receiver, a synchronization circuit and a control circuit. The local clock is adapted to clock processes of the communication node. The transmitter is adapted to transmit communication signals. The receiver is adapted to receive communication signals. The synchronization circuit is adapted to synchronize the local clock in response to a preamble in a received initial communication signal. The control circuit is adapted to control the transmitter and the receiver. The control circuit is further adapted to direct the transmittal of sub-frame communication signals while the local clock of the communication node is synchronized with at least one other communication node in a communication system.

In further still another embodiment, a communication system is provided. The communication system comprises two or more communication nodes. Each node is adapted to synchronize a local clock to establish communications based on a synchronizing preamble received in an initial communication frame. Each node further is further adapted to receive and transmit communication sub-frames until communication synchronization has been lost due to clock drift.

In yet another embodiment an ultra wideband communication node is provided. The ultra wideband communication node comprises a means for receiving communication signals, a means for transmitting communication signals, a clocking means, a means for synchronizing the clocking means and a means for exchanging communication sub-frames. The communication signals include initial communication frames and sub-frames, wherein an initial communication frame includes a preamble, data bits and a switch point and a communication sub-frame includes only data-bits and a switch point. The means for synchronizing the clocking means is in response to a preamble received in a communication frame. The means for exchanging communication sub-frames is with at least one other communication node while clock synchronization of the clocking means has not drifted beyond a point in which data communication error is unacceptable.

DRAWINGS

The present invention can be more easily understood and further advantages and uses thereof more readily apparent, when considered in view of the description of the preferred embodiments and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention provide methods and systems for efficiently using time-synchronized communications systems. In one or more embodiments, the present invention provides methods for sub-frame synchronized signaling that avoids many of the long resynchronization periods caused by preambles at the start of each transmission frame. This method provides faster time response between network nodes. The elimination of certain resynchronization preambles also eliminates the necessity of receivers having to wait for a preamble to determine when a transmission is coming and thus, provides significant energy savings to the transmitter and receiver nodes.

Figure 1A:
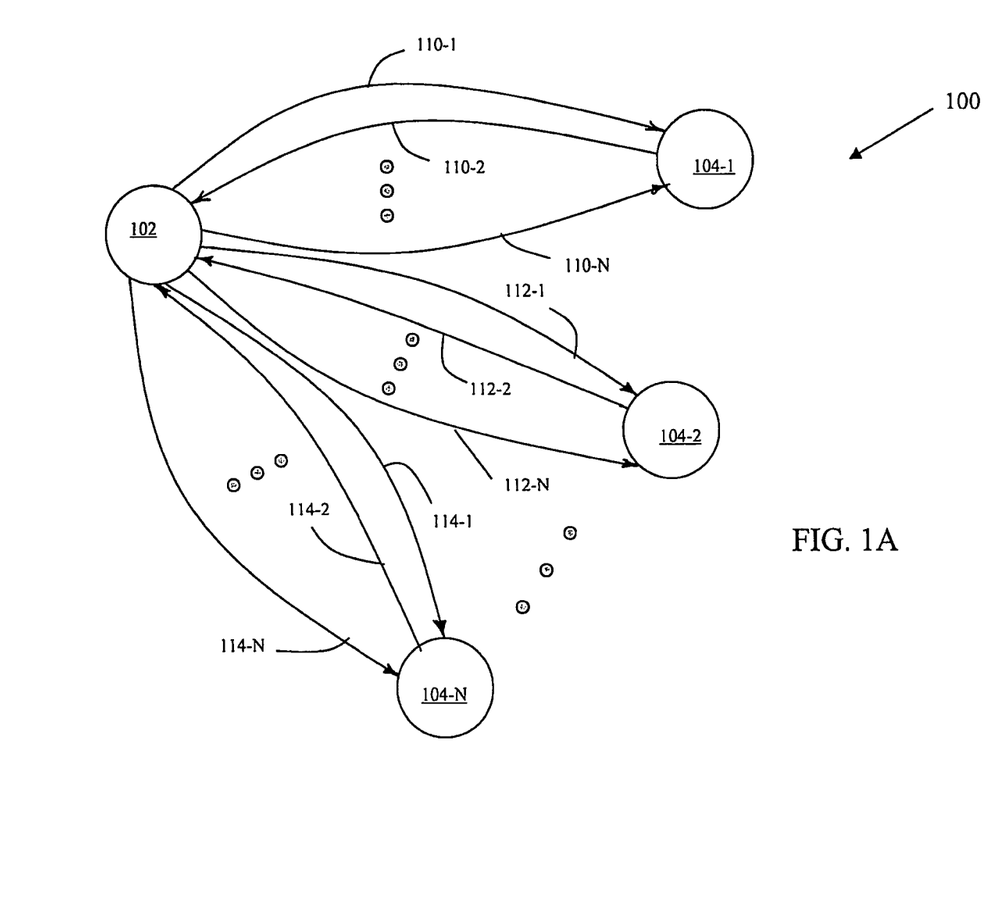
FIG. 1A is a diagram of one embodiment of a data communications system of the present invention.

In FIG. 1A an embodiment of a data communications system 100 of the present invention is illustrated. In this embodiment, the data communication system 100 includes communication node 102 and communication nodes 104-1 through 104-N. The communication nodes 102 and 104-1 though 104-N are adapted to communicate with each other. In particular, in the embodiment illustrated in FIG. 1A, communication node 102 is in communication with communication nodes 104-1 through 104-N. However, it will be understood that the present invention can generally apply to two or more communication nodes, any of which may be the initial transmitting node. In embodiments of the present invention, a first communication node initiates a message exchange. In the embodiment of FIG. 1A, this is communication node 102. A message exchange is started when communication node 102 transmits a communication signal that contains a preamble. The preamble is a known sequence of information that includes information regarding clock timing. Each receiving node uses the information in the preamble to synchronize its local clock so communication between the transmitting node and the receiving nodes can occur. In embodiments of the present invention, communication between nodes is maintained without sending an additional preamble until internal clocks in the respective nodes have drifted apart far enough that synchronization suitable for UWB data communications has been lost.

Referring back to FIG. 1A, the first communication signals 110-1, 112-1 and 114-1 containing the preambles and other data to be exchanged are illustrated. The first communication signals may be referred to as synchronization communication signals. Node 102 is the transmitting node when transmitting signals 110-1, 112-1 and 114-1 and nodes 104-1 through 104-N are the receiving nodes when receiving the respective first communication signals 110-1, 112-1 and 114-1. At the end of each communication signal is an indication that the signal is complete. In one embodiment, this is referred to a switch point. The switch point provides a signal to the receiving node that it can now become a transmitting node to transmit a communication signal in response to a received signal. An example of this are signals 110-2, 112-2 and 114-2 transmitted from the respective nodes 104-1, 104-2 and 104-N back to node 102 one after another in a pre-arranged sequence. The message exchange between the nodes continues like this until, as discussed above, the internal clocks in the respective nodes have drifted far enough apart that synchronization suitable for UWB data communications has been lost. The last communication signal between nodes 102 and 104-1 through 104-N is illustrated as signals 110-N, 112-N and 114-N in FIG. 1A.

Figure 1B:
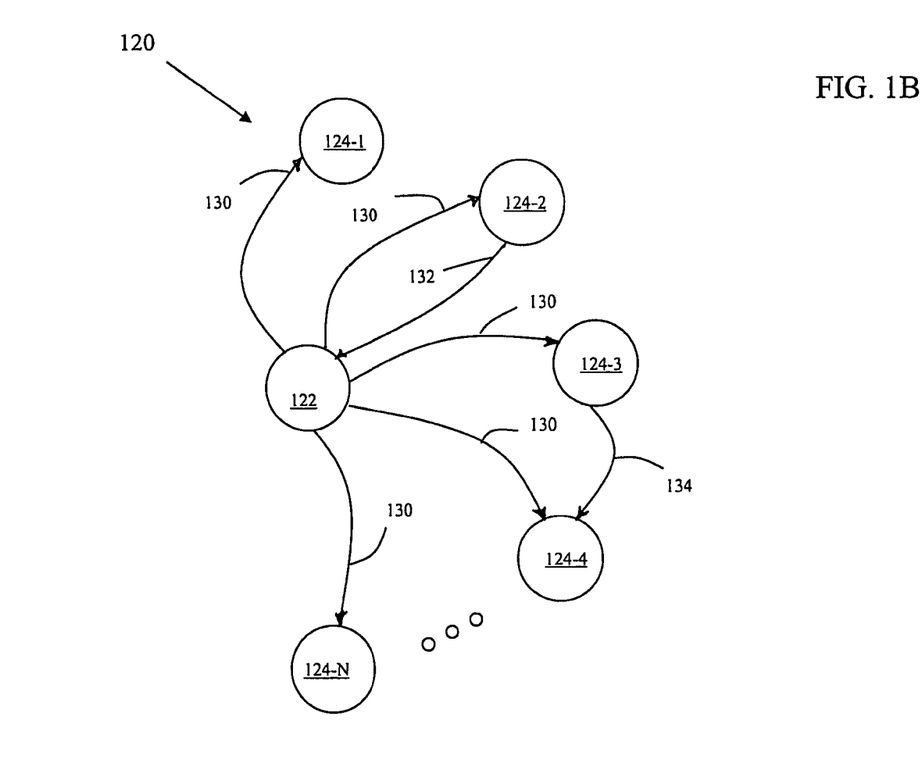
FIG. 1B is a diagram of another embodiment of a data communication system of the present invention.

In one embodiment, the data communication system 100 is a point to point communication system where only two nodes are participating at a time. An example of this system in reference to the communication system of FIG. 1A is when node 120 sends a first signal 110-1 to node 104-1 and then a second signal 112-1 at a later time to node 104-2. In another embodiment of the present invention, the data communication system 120 is arranged in a broadcast network where a transmitted signal is received by multiple nodes simultaneously. An example of this is illustrated in FIG. 1B. In this embodiment, only a single preamble is required since only one initial transmission signal is sent to the multiple nodes. Referring to FIG. 1B, an initial signal 130 including the single preamble is broadcast from node 122 to nodes 124-1 through 124-N simultaneously. In this embodiment, a switch point in the transmitted signal is used to indicate the next transmit node. For example, in the communication system 120 of FIG. 1B, the next node to transmit, as directed by the switch point, is node 124-2. As illustrated signal 132 is transmitted from node 124-2 to node 122. Further in this example, node 124-3 is then directed to transmit signal 134 to node 124-4.

Figure 2:
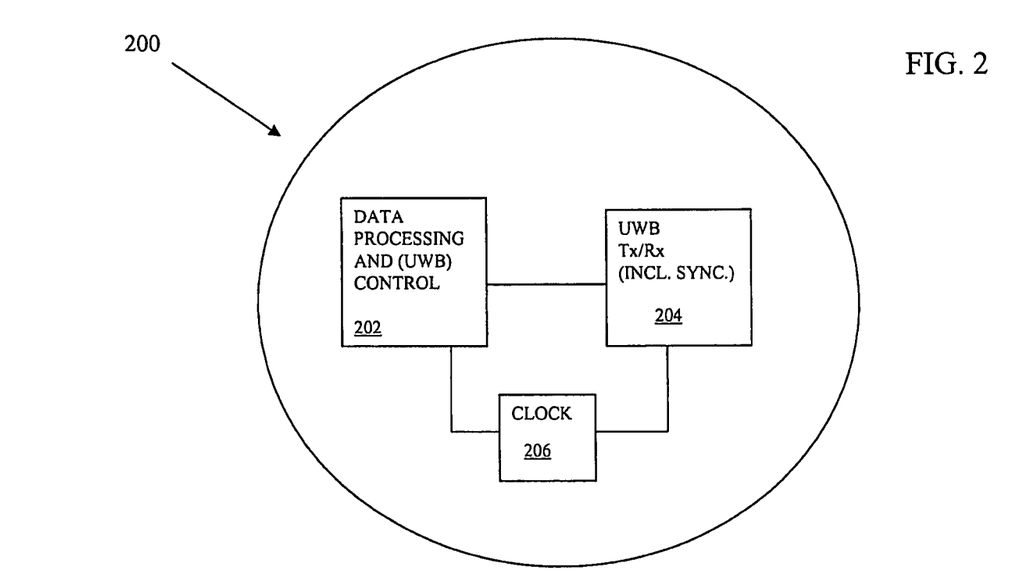
FIG. 2 is communication node of one embodiment of the present invention.
Figure 3:
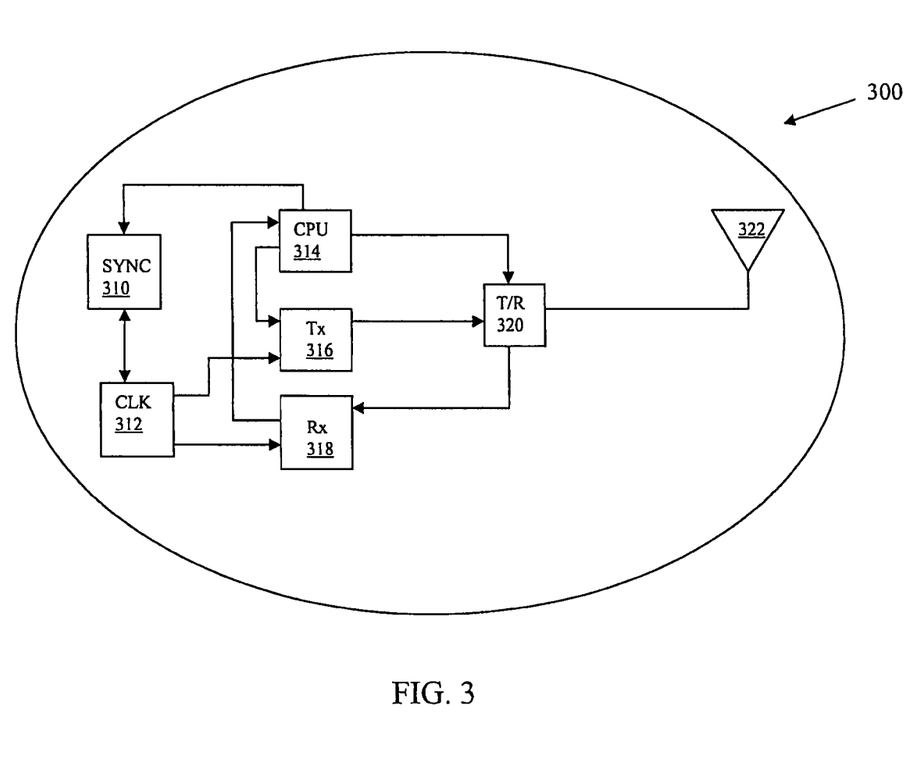
FIG. 3 is a communication node of another embodiment of the present invention.

FIG. 2, illustrates one embodiment of a node 200 of the present invention. Node 200 includes a data processing and UWB control circuit 202, a UWB transmit (Tx)/receive (Rx) circuit 204 and a local clock 206. The Tx/Rx circuit 204 includes a clock synchronization circuit. As illustrated the clock 206 is used by both the control circuit 202 and the Tx/Rx circuit 204. The Tx/Rx circuit uses the clock, for among other things, to determine time intervals between data. The control circuit 202 uses the clock among other things, to determine when to send and pass received data. An example of a more detailed node 300 of one embodiment of the present invention is illustrated in FIG. 3. Node 300 includes an antenna 322, a transmit (T)/receive (R) switch 320, a CPU 314, a Tx 316, a Rx 318, a clock synchronization circuit 310 and a local clock 312. The CPU 314 controls the T/R switch 320. When node 300 is transmitting the T/R switch 320 is placed in a transmitting position, and when node 300 is receiving the T/R switch is placed in a receiving position. The clock synchronization circuit 310 is used to adjust and monitor the local clock 312. In particular, when an initial transmission with a preamble is received through the receiver 318, the synchronization circuit 310 is used to synchronize clock 312 with the clock of the node which sent the initial transmission. After the clocks are synchronized, the clock synchronization circuit 310 monitors the drift of the clock. In one embodiment, clock drift is monitored by measuring the error rate resulting from using the local clock to detect the time-synchronous signaling from the transmitter. As the clock drifts (away from the Tx clock) the error rate increases. The error rate is measured by a detecting when a cyclic redundancy code (CRC) scheme, forward error correction method, or other error detection and correction scheme fails to successfully correct data errors. A CRC protocol uses a CRC character that is generated from each data block of data at a transmission end by a transmitting device. The value of the CRC character depends on the hexadecimal value of the number ones in the data block. The transmitting device calculates the value of the CRC character and appends it to its associated data block. At the receiving end, a receiving device makes a similar calculation on the data block and compares it with the added character (i.e. the CRC character). If there is a match, the data block is considered to be error free. If there is not a match, an error has been detected and the receiver will request a retransmission of the data block.

As illustrated in FIG. 3, the clock is further in communication with the transmitter 316 to clock the transmission of data in a transmission signal and with the receiver 318 to clock the receiving of data in a received signal. The CPU 314 is also in communication with the receiver 318 to process data in a received signal. The CPU 314 is further adapted to process data to be transmitted. There are three keys to obtaining synchronized signaling in data communications systems of embodiments for the present invention. First, synchronized signaling requires CPU 314 (or controller) of each node to obtain the accurate propagation time between nodes. Second, the nodes in communication must be using the same known frame format. Lastly, the clock drift must be monitored between data communication nodes and must be small enough to ensure time-synchronization after each sub-frame duplex or link reversal.

Figure 4A:
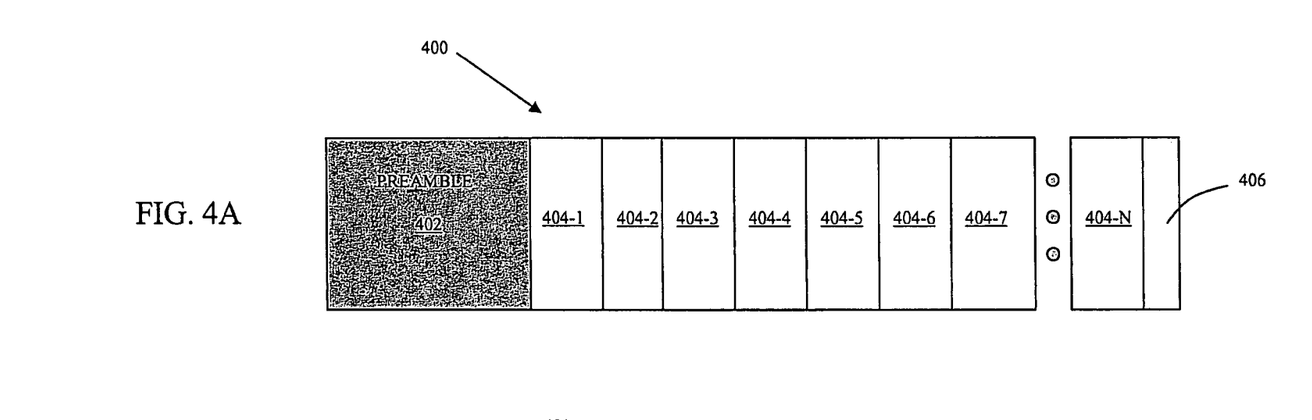
FIG. 4A is an initial communication sub-frame of one embodiment of the present invention.

Referring to FIG. 4A, an example of an initial signal 400 is illustrated. In particular, the initial signal in this embodiment is an initial communication frame 400. An initial communication frame includes a preamble and a sub-frame containing data bits and a switch point. The initial communication frame 400 is sent from a transmitting node (first node) and includes preamble 402. Preamble 402 contains information used by one or more receiving nodes for synchronization of the receiving node(s) local clock(s). After the preamble, information or data is transmitted. The information or data is generally referenced as 404-1 through 404-N and in one embodiment are data communication bits. After the data 404-1 through 404-N has been transmitted, a switch point is transmitted 406. The switch point 406 indicates that the data has all been sent in this sub-frame. Moreover, in one embodiment the switch point initiates a link reversal or duplexing. Link reversal or duplexing instructs a particular receiving second node to change into a transmitting node and the transmitting node to change into a receiving node. In particular, in one embodiment, once the transmitting node has encountered a switch point, the transmitting node stops transmission, switches into receive mode and adjusts its local clock to reflect the time delay coming back from a communication signal from the particular receiving second node. Further in other embodiments, the switch point 406 is used to indicate a change in signal format.

Figure 4B:
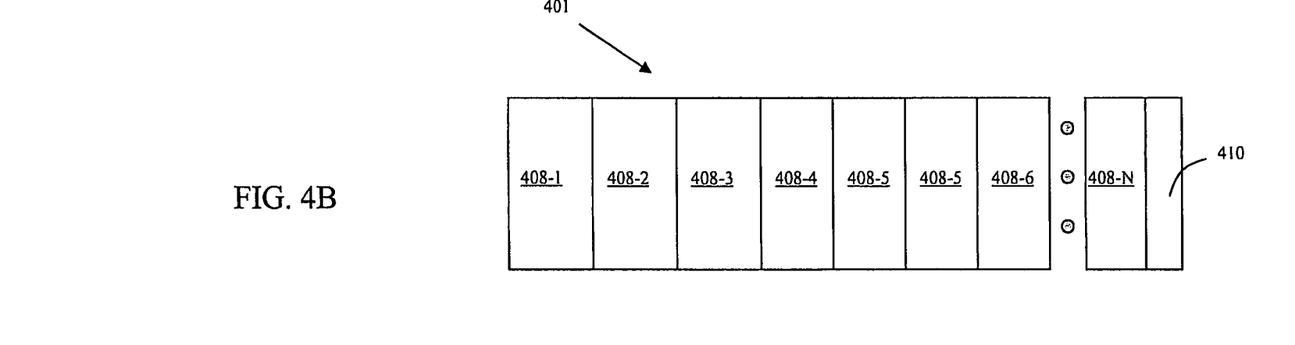
FIG. 4B is a communication signal of one embodiment of the present application.

FIG. 4B illustrates a second communication sub-frame 401. This second communication sub-frame is sent by the second node to the first node. The second communication sub-frame includes data 408-1 through 408-N and a switch point. As illustrated, no preamble is required in this second communication sub-frame because the clocks in the first and the second nodes are still synchronized at this point. The communication between nodes occurs without the need for additional preambles in the frames, such as frame 401, until the clocks of the first and second nodes have drifted out of time synchronization. Once they have drifted out of time synchronization another initial communication frame with a preamble, similar to preamble 402 of FIG. 4A, is required to resynchronize the respective clocks.

Figure 5:
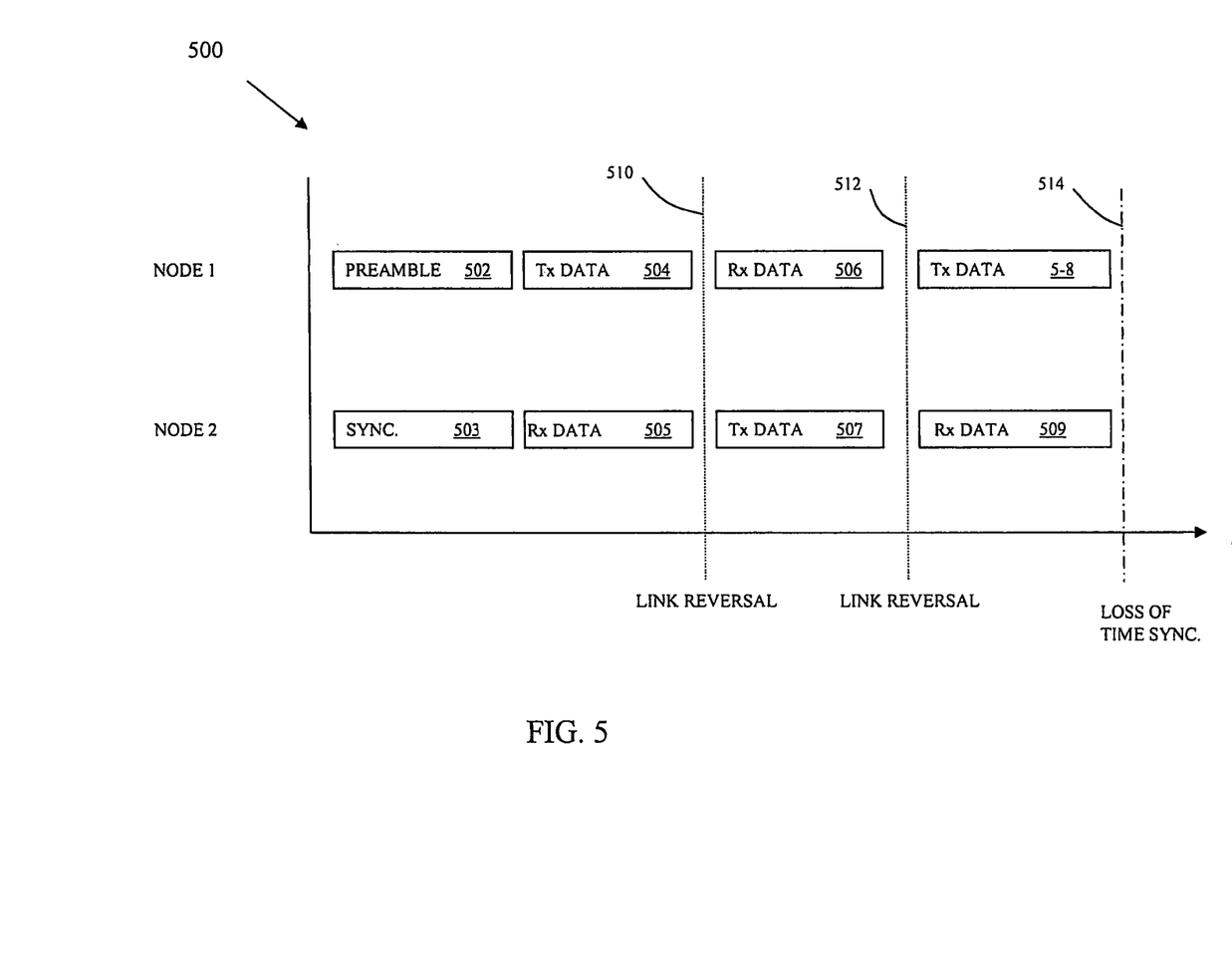
FIG. 5 is a graph illustrating communications of one embodiment of the present invention.

This is further illustrated in graph 500 of FIG. 5. The embodiment of FIG. 5, illustrates the communication between a first node and a second node. The first node sends a frame including preamble (502). In response to the preamble (502), the second node synchronizes (503) its local clock (503). Data is then transmitted (504) by the first node in a sub-frame. The second node receives (505) the sub-frame data. A link reversal point (510) (or switch point) is then reached. The second node is than adapted to transmit (507)

data and the first node is adapted to receive the data (506) in this second sub-frame. Another link reversal is encountered (512). In response to the link reversal (512) the first node is adapted to transmit (508) data and the second node is adapted to receive (509) the data in a third sub-frame. In this example, a loss of time synchronization is then encountered (514). To continue the message exchange, a preamble will have to be sent to reestablish synchronization between nodes.

Figure 6:
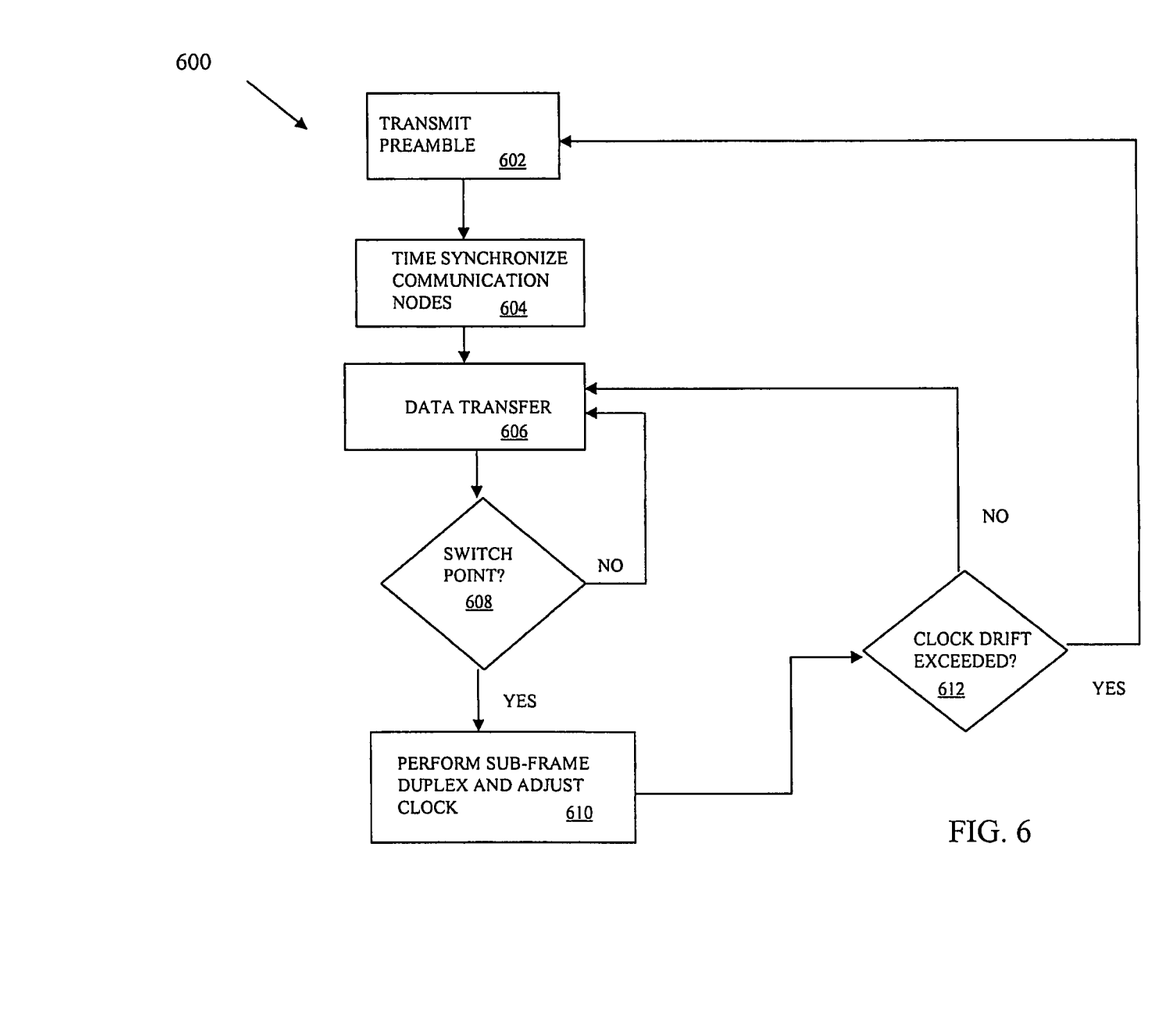
FIG. 6 is a flow diagram of a transmission of a communication signal of one embodiment of the present invention.

Referring to FIG. 6, a transmit flow diagram 600 of one embodiment is illustrated. The transmit diagram begins by transmitting a preamble (602). A receiving node than synchronizes its local clock according to the preamble. Once the receiving node has been synchronized (604), data is transferred from the transmitting node (606). The data transfer continues (606), until a switch point is encountered (608). If a switch point has been encountered (608), a sub-frame duplex is performed (i.e. switching between transmitting and receiving function in a node) and the local clock is adjusted (610). The local clock of the transmitting node (i.e. the node being switched from a transmitting node to a receiving node) is adjusted in this embodiment to take into consideration the propagation time between nodes. If the clock drift is exceeded (612) then the node ceases data transfer and must initiate transmission of another preamble (602).

Figure 7:
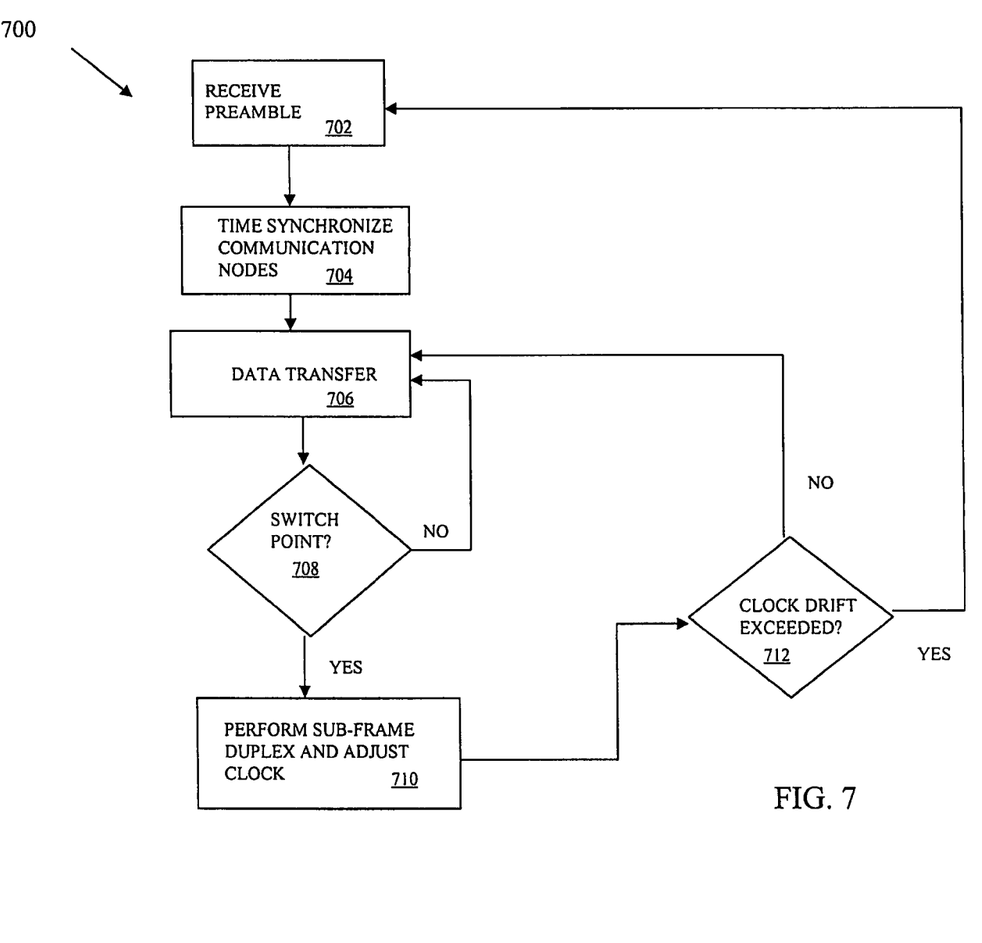
FIG. 7 is a flow diagram of a receiving of a communication signal of one embodiment of the present invention.

FIG. 7 is a receiving flow diagram 700 of one embodiment of the present invention. The receiving flow diagram 700 starts by receiving a preamble (702). In response to the preamble (702), the node synchronizes its local clock to establish communication (704). Data is then transferred to the receiving node (706). The data transfer continues (706), until a switch point is encountered (708). If a switch point has been encountered (708), a sub-frame duplex is performed (i.e. switching between transmitting and receiving function in a node) and the local clock is adjusted (710). The local clock is adjusted in this embodiment to take into consideration the propagation time between the nodes. If the clock drift is exceeded (712) then the node ceases data transfer and awaits reception of another preamble (702).

What is claimed is:

1. A method of communication, the method comprising:
   transmitting a communication signal having a synchronization preamble from a first node;
   setting a local clock of at least one second node pursuant to the synchronization preamble to synchronize communications between the first and at least one second node; and
   exchanging subsequent communication signals between the first and at least one second node without additional preambles until synchronization suitable for data communication is lost;
   wherein exchanging subsequent communication signals between the first and at least one second node without additional preambles includes:
     transmitting one or more subsequent communication signals from the first node to the at least one second node without additional preambles; and
     when a link reversal point is encountered:
       performing a sub-frame duplex to receive at the first node one or more subsequent communication signals transmitted without additional preambles from the at least one second node; and
       adjusting a local clock at the first node to take into consideration propagation time between the first node and the at least one second node.

2. The method of claim 1, wherein the initial communication signal is a frame including the preamble, data bits and a switch point.

3. The method of claim 1, wherein each subsequent communication signal is a sub-frame including data bits and a switch point.

4. The method of claim 1, further comprising:
   using a switch point in the communication signals to indicate all data in the communication signal has been sent.

5. The method of claim 1, further comprising:
   using a switch point in the communication signals to initiate a link reversal.

6. The method of claim 1, further comprising:
   using a switch point in the communication signals to indicate a change in communication format.

7. The method of claim 1, further comprising:
   transmitting another synchronization communication signal to re-establish communication between the first and at least one second node once synchronization suitable for data communication is lost.

8. The method of claim 1, further comprising:
   monitoring the synchronization of data communications between the first and second nodes.

9. The method of claim 8, wherein monitoring the synchronization of data communications further comprises:
   measuring the error rate in communication signals.

10. A method of communicating in an ultra wideband communication (UWB) system, the method comprising:
    transmitting an initial communication signal frame having a preamble that contains clock synchronization information from a first node;
    receiving the initial communication signal frame with at least one second node;
    synchronizing a local clock in the at least one second node pursuant to the clock synchronization information in the initial transmission signal frame;
    exchanging sub-frame communication signals between the first node and at least one second node;
    monitoring clock synchronization drift between the local clock in at least one second node and a local clock in the first node; and
    when the clock synchronization drift has drifted far enough apart that synchronization suitable for UWB data communication has been lost, transmitting another initial communication signal frame having the preamble that contains the clock synchronization information to re-synchronize communication between the nodes;
    wherein exchanging sub-frame communication signals between the first node and at least one second node includes:
      transmitting one or more sub-frame communication signals from the first node to the at least one second node without additional preambles; and
      when a link reversal point is encountered:
        performing a sub-frame duplex to receive at the first node one or more sub-frame communication signals transmitted without additional preambles from the at least one second node, and
        adjusting a local clock at the first node to take into consideration propagation time between the first node and the at least one second node.

11. The method of claim 10, further comprising:
    switching at least one second node from receiving to transmitting based on a switch point contained in a received communication signal.

12. The method of claim 10, further comprising:
    using a switch point in a received communication signal to indicate the end of data bits.

13. The method of claim 10, further comprising:
using a switch point in a received communication signal to indicate a change in data format.

14. The method of claim 10, further comprising:
using a switch point to direct at least one second node to transmit a next communication signal.

15. The method of claim 10, wherein monitoring clock synchronization further comprises:
measuring the error rate in communication signals.

16. A communication node comprising:
a local clock adapted to clock operations of the communication node;
a transmitter/receiver circuit adapted to selectively transmit and receive communication signals;
a synchronization circuit adapted to synchronize the local clock with a received communication signal from another communication node to establish communications between the communication nodes; and
a control circuit adapted to control the transmitter/receiver circuit and the synchronization circuit, the control circuit being adapted to process communication signals, the control circuit further adapted to direct communications between the communication nodes without re-synchronizing the local clock until the clock drift between communication nodes makes communications unreliable;
wherein the control circuit is adapted to switch the transmitter/receiver circuit between receive mode and transmit mode and to adjust the local clock for propagation time between the communication nodes when a link reversal point has been encountered.

17. The communication node of claim 16, the transmitter/receiver circuit further comprising:
an antenna; and
a transmitter/receiver switch adapted to selectively couple either the transmitter or the receiver to the antenna.

18. The communication node of claim 16, wherein the control circuit is further adapted to switch the transmitter/receiver circuit between receive mode and transmit mode based on a received switch point in a communication signal.

19. A communication node comprising:
a local clock adapted to clock processes of the communication node;
a transmitter adapted to transmit communication signals;
a receiver adapted to receive communication signals;
a synchronization circuit adapted to synchronize the local clock in response to a preamble in a received initial communication signal; and
a control circuit adapted to control the transmitter and the receiver, the control circuit further adapted to direct the transmittal of sub-frame communication signals without additional preambles while the local clock of the communication node is synchronized with at least one other communication node in a communication system;
wherein the control circuit is adapted to switch between transmitting and receiving modes and to adjust the local clock for propagation time between the communication nodes when a link reversal point has been encountered.

20. The communication node of claim 19, wherein the sub-frame communication signals include data information and a switch point.

21. The communication node of claim 19, wherein the control circuit is further adapted to switch between transmitting and receiving modes based on a switch point received in a communication signal.

22. The communication node of claim 19, wherein the control circuit is further adapted to transmit sub-frame communication signals to select one of at least one other communication node based on a switch point received in a communication signal.

23. The communication node of claim 19, further comprising:
an antenna; and
a transmitter/receiver switch adapted to selectively couple either the transmitter or the receiver to the antenna.

24. A communication system comprising:
two or more communication nodes, each node being adapted to synchronize a local clock to establish communications based on a synchronizing preamble received in an initial communication frame, each node further adapted to receive and transmit communication sub-frames without additional preambles until communication synchronization has been lost due to clock drift;
wherein each node is further adapted to switch between transmitting and receiving modes and to adjust a respective local clock for propagation time between the communication nodes when a link reversal point has been encountered.

25. The communication system of claim 24, wherein each communication node comprises:
a local clock adapted to clock operations of the communication node;
a transmitter/receiver circuit adapted to selectively transmit and receive communication signals;
a synchronization circuit adapted to synchronize the local clock with a received communication signal from another communication node to establish communications between the communication nodes; and
a control circuit adapted to control the transmitter/receiver circuit and the synchronization circuit, the control circuit being adapted to process communication signals, the control circuit further adapted to direct communications between the communication nodes without re-synchronizing the local clock until a clock drift between communication nodes makes communications unreliable.

26. An ultra wideband communication node comprising:
a means for receiving communication signals including initial communication frames and sub-frames, wherein an initial communication frame includes a preamble, data bits and a switch point and a communication sub-frame includes only data-bits and a switch point;
a means for transmitting communication signals including communication frame and sub-frames;
a clocking means;
a means for synchronizing the clocking means in response to a preamble received in a communication frame;
a means for exchanging communication sub-frames with at least one other communication node while clock synchronization of the clocking means has not drifted beyond a point in which data communication error is un-acceptable; and
means for adjusting the clocking means for propagation time between communication nodes when a link reversal point has been encountered.

27. The ultra wideband communication node of claim 26, further comprising:
a means for signaling the end of data transmission.

28. The ultra wideband communication node of claim 26, further comprising:
a means for switching between transmitting and receiving modes.

29. The ultra wideband communication node of claim 26, further comprising:

a means for monitoring data communication errors.

\* \* \* \* \*